United States Patent
Diril

(10) Patent No.: US 10,834,385 B1
(45) Date of Patent: Nov. 10, 2020

(54) SYSTEMS AND METHODS FOR ENCODING VIDEOS USING REFERENCE OBJECTS

(71) Applicant: Facebook, Inc., Menlo Park, CA (US)

(72) Inventor: Abdulkadir Utku Diril, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/004,982

(22) Filed: Jun. 11, 2018

(51) Int. Cl.
| | |
|---|---|
| *H04N 7/12* | (2006.01) |
| *H04N 19/105* | (2014.01) |
| *G06K 9/00* | (2006.01) |
| *H04N 19/172* | (2014.01) |
| *G06K 9/62* | (2006.01) |
| *G06N 20/00* | (2019.01) |

(52) U.S. Cl.
CPC ....... *H04N 19/105* (2014.11); *G06K 9/00744* (2013.01); *G06K 9/6256* (2013.01); *G06N 20/00* (2019.01); *H04N 19/172* (2014.11)

(58) Field of Classification Search
CPC .... H04N 19/105; H04N 19/20; H04N 19/426; G06K 9/00718
See application file for complete search history.

(56) References Cited

U.S. PATENT DOCUMENTS

2016/0173882 A1* 6/2016 Mishra ................. H04N 19/136
375/240.08
2018/0199066 A1* 7/2018 Ross .................... H04N 19/625

* cited by examiner

*Primary Examiner* — Peet Dhillon
(74) *Attorney, Agent, or Firm* — FisherBroyles, LLP

(57) ABSTRACT

A computer-implemented method for encoding videos using reference objects may include identifying, by a computing device, a video to be encoded. The method may also include identifying, by the computing device, a set of objects that appear in the video as reference images for video encoding. In addition, the method may include training a machine learning algorithm to detect an object from the set of objects. Furthermore, the method may include encoding each frame of the video using the trained machine learning algorithm. Various other methods, systems, and computer-readable media are also disclosed.

20 Claims, 5 Drawing Sheets

SYSTEMS AND METHODS FOR ENCODING VIDEOS USING REFERENCE OBJECTS

BACKGROUND

Video encoding may facilitate transferring videos from one device to another or broadcasting videos over a network connection. For example, a video file may be sent from a computer to a mobile device, which may then recognize the encoding and enable a user to play and watch the video. Additionally, video encoding may often compress some of the video data to reduce the size of a video file. Rather than saving each complete frame of a video and playing back the frames in sequential order, video encoding may reduce the number of saved frames and/or the amount of data saved for each frame. Through this process, large video files may remain a manageable size to store or stream.

However, by reducing the video data that is saved for a video, traditional video encoding processes may suffer from a degree of loss, which may compromise the quality of the video. For example, one traditional video encoding process may include selecting reference frames, divided into macroblocks, that help search for and identify similar pixels from one frame to the next. In this example, macroblocks of other frames may be compared to detect a region of a reference frame that appears similar, thus reducing the amount of redundant macroblocks that may need to be saved for these other frames. Unfortunately, some of the data removed through this process may contain important image data. For example, when a frame is vastly different from a previous frame, traditional methods may not find an accurate reference frame match. Furthermore, traditional encoding methods may require using full frames as reference frames which may cause inefficient compression. Thus, better methods of balancing efficient compression with minimal data loss are needed to improve upon traditional brute force methods.

SUMMARY

As will be described in greater detail below, the instant disclosure describes various systems and methods for encoding videos using reference objects to identify similar components between frames. In one example, a method for encoding videos using reference objects may include identifying, by a computing device, a video to be encoded. The method may also include identifying, by the computing device, a set of objects that appear in the video as reference images for video encoding. Additionally, the method may include training a machine learning algorithm to detect an object from the set of objects. Furthermore, the method may include encoding each frame of the video using the trained machine learning algorithm.

In one embodiment, the video to be encoded may include a video file. Additionally or alternatively, the video may include a live streaming video.

In some examples, identifying the set of objects may include identifying a list of expected objects for the video, performing an initial pass of a set of frames of the video to detect objects, and/or storing the detected objects in an object buffer. In these examples, the reference images may include a set of images for each object in the list of expected objects and/or a portion of each frame in the set of frames of the video that contains a detected object. Additionally, in these examples, training the machine learning algorithm to detect the object may include training the machine learning algorithm using a pre-trained object-detection model, training the machine learning algorithm using the reference images for the object, performing a second pass of the set of frames to detect objects using the object buffer, and/or updating the object buffer with a new reference image.

In some embodiments, encoding each frame of the video may include detecting one or more objects in each frame using the machine learning algorithm and compressing each frame to reduce data on non-object images. In these embodiments, the above method may further include performing reference-frame compression for frames in which no object is detected by the machine learning algorithm. For example, the reference-frame compression may include selecting one or more reference frames, comparing one or more later frames of the video with a reference frame, and/or compressing a later frame to reduce redundant image data.

In one embodiment, the above method may further include improving the machine learning algorithm with new reference images.

In addition, a corresponding system for encoding videos using reference objects may include several modules stored in memory, including an identification module that identifies, by a computing device, a video to be encoded. The system may also include an object module that identifies, by the computing device, a set of objects that appear in the video as reference images for video encoding. Additionally, the system may include a training module that trains a machine learning algorithm to detect an object from the set of objects. Furthermore, the system may include an encoding module, stored in memory, that encodes each frame of the video using the trained machine learning algorithm. Finally, the system may include one or more processors that execute the identification module, the object module, the training module, and the encoding module.

In some examples, the above-described method may be encoded as computer-readable instructions on a computer-readable medium. For example, a computer-readable medium may include one or more computer-executable instructions that, when executed by at least one processor of a computing device, may cause the computing device to identify, by the computing device, a video to be encoded. The instructions may also cause the web-based computing system to identify, by the computing device, a set of objects that appear in the video as reference images for video encoding. Additionally, the instructions may cause the web-based computing system to train a machine learning algorithm to detect an object from the set of objects. Furthermore, the instructions may cause the web-based computing system to encode each frame of the video using the trained machine learning algorithm.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
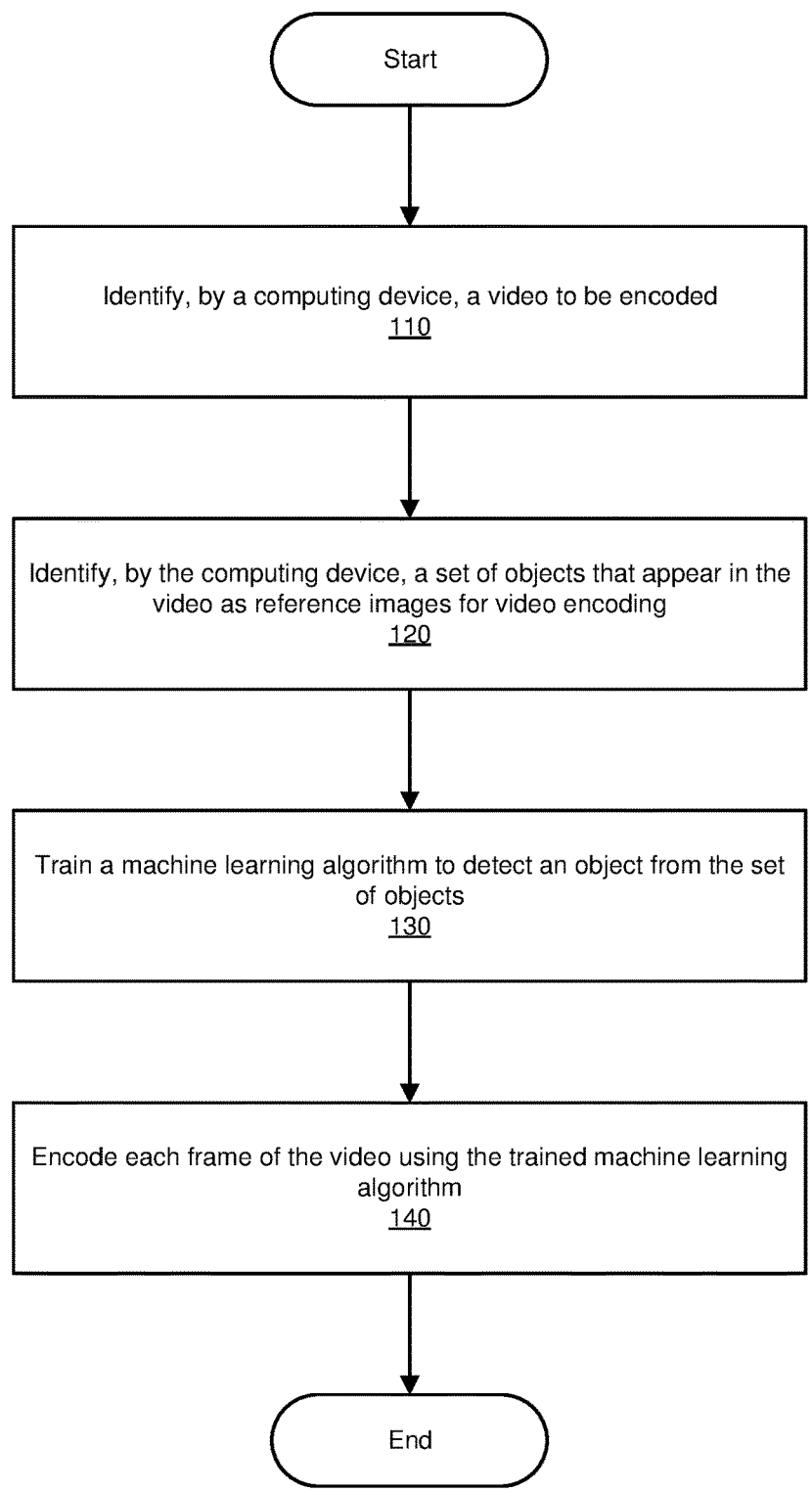
FIG. 1 is a flow diagram of an exemplary method for encoding videos using reference objects.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for encoding videos using reference objects. As will be explained in greater detail below, embodiments of the instant disclosure may, by using reference objects to detect important constructs in video frames, improve the compression of a video during video encoding. For example, the disclosed systems and methods may utilize a list of objects that contain reference images and/or perform an initial pass through the video to detect potential objects. The disclosed systems and methods may then train a machine learning algorithm to detect known objects within each frame of a video. By subsequently compressing frames using object data, the systems and methods described herein may reduce redundant video data without losing important contextual information. By further performing traditional reference-frame compression when no objects are detected, the disclosed systems and methods may then ensure all frames of a video are properly encoded.

In addition, the systems and methods described herein may improve the functioning of a computing device by improving video compression to enable easier storing and transmission of videos. These systems and methods may also improve the fields of video encoding and video streaming by improving the accuracy and efficiency of matching frames to known references. Thus, the disclosed systems and methods may improve over traditional brute-force search methods of video encoding by increasing the efficiency of compression using machine learning to detect reference objects.

The following will provide, with reference to FIG. 1, detailed descriptions of computer-implemented methods for encoding videos using reference objects. Detailed descriptions of a corresponding exemplary system will be provided in connection with FIG. 2. In addition, detailed descriptions of exemplary identifications of reference objects will be provided in connection with FIGS. 3-4. Furthermore, detailed descriptions of an exemplary video encoding process will be provided in connection with FIG. 5.

FIG. 1 is a flow diagram of an exemplary computer-implemented method 100 for encoding videos using reference objects. As used herein, the term "video encoding" generally refers to a process of compressing a video to reduce the size and complexity required for storing and/or transmitting the video. The steps shown in FIG. 1 may be performed by any suitable computer-executable code and/or computing system, including the system illustrated in FIG. 2. In one example, each of the steps shown in FIG. 1 may represent an algorithm whose structure includes and/or is represented by multiple sub-steps, examples of which will be provided in greater detail below.

Figure 2:
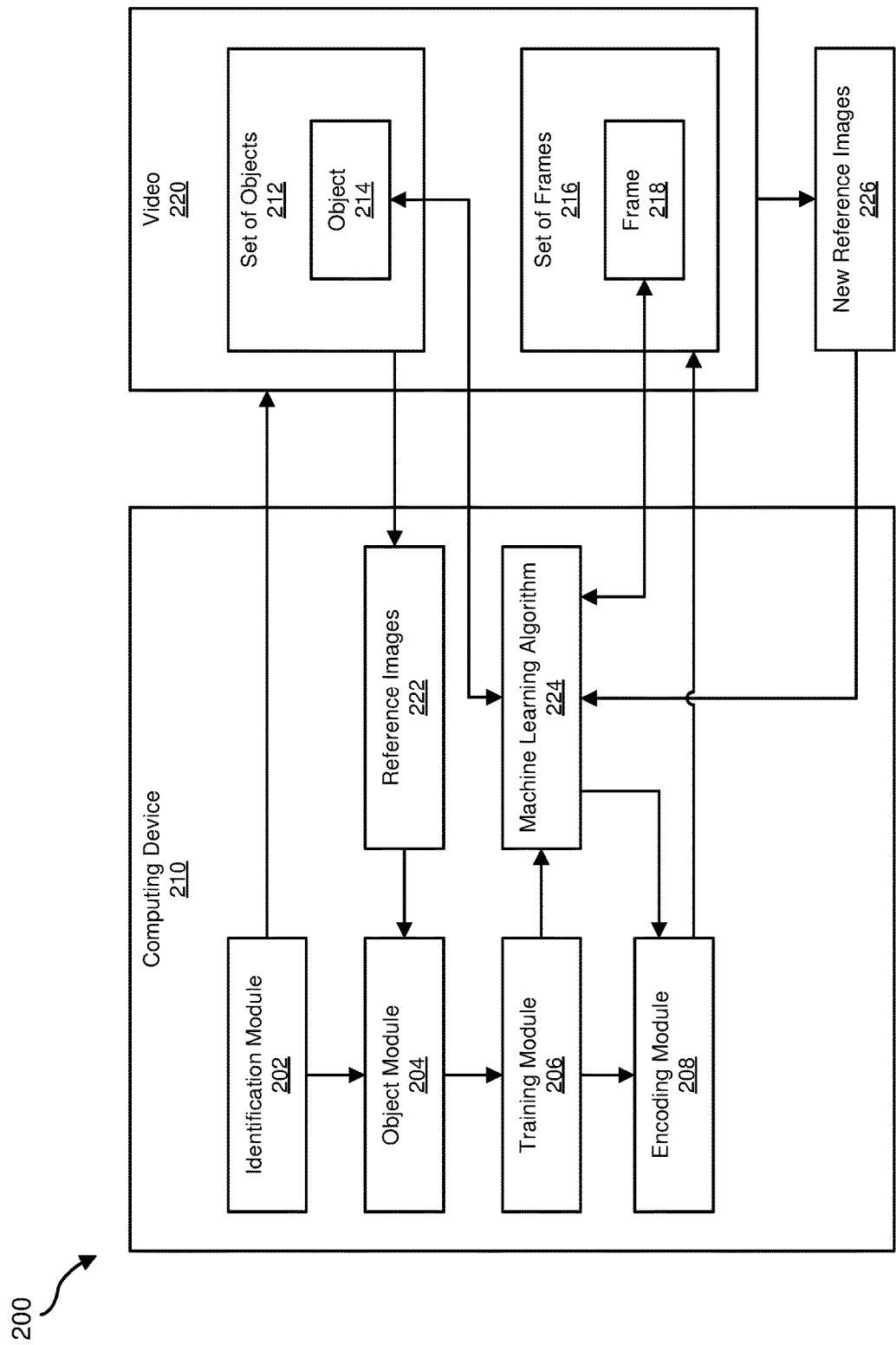
FIG. 2 is a block diagram of an exemplary system for encoding videos using reference objects.

As illustrated in FIG. 1, at step 110 one or more of the systems described herein may identify, by a computing device, a video to be encoded. For example, FIG. 2 is a block diagram of an exemplary system 200 for encoding videos using reference objects. As illustrated in FIG. 2, an identification module 202 may, as part of a computing device 210, identify a video 220 to be encoded.

Computing device 210 generally represents any type or form of computing device that is capable of reading computer-executable instructions. For example, computing device 210 may represent a video server hosting video files to be streamed over a network connection to endpoint devices. Additional examples of computing device 210 include, without limitation, laptops, tablets, desktops, servers, cellular phones, Personal Digital Assistants (PDAs), multimedia players, embedded systems, wearable devices (e.g., smart watches, smart glasses, virtual reality headsets, etc.), gaming consoles, combinations of one or more of the same, and/or any other suitable computing device.

The systems described herein may perform step 110 in a variety of ways. For example, in some embodiments, video 220 of FIG. 2 may include a video file and/or a live streaming video. As used herein, the term "live streaming" generally refers to a process in which a content provider continuously broadcasts online content that may be viewed by users in real time or close to real time.

Figure 3:
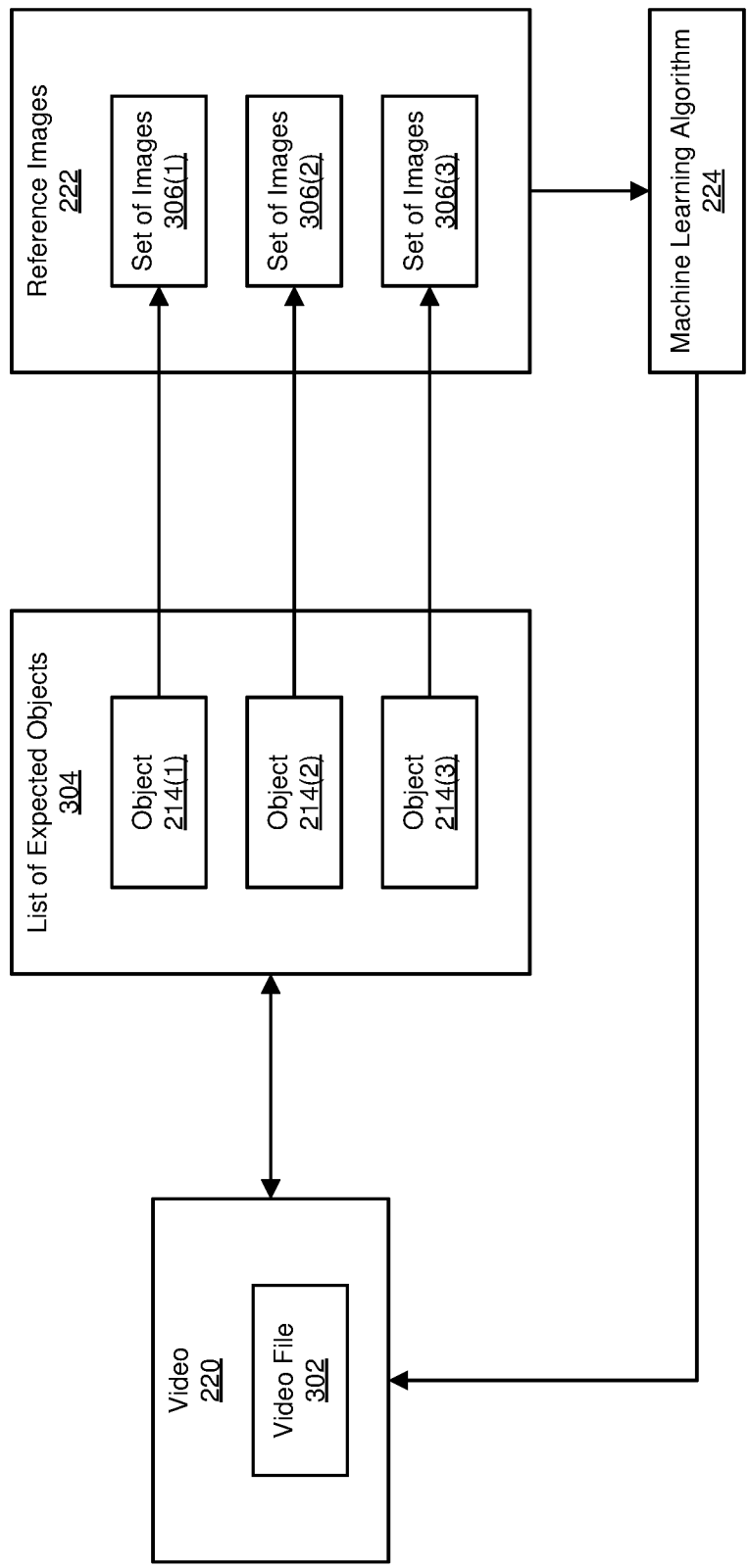
FIG. 3 is a block diagram of detecting reference objects for an exemplary video file.
Figure 4:
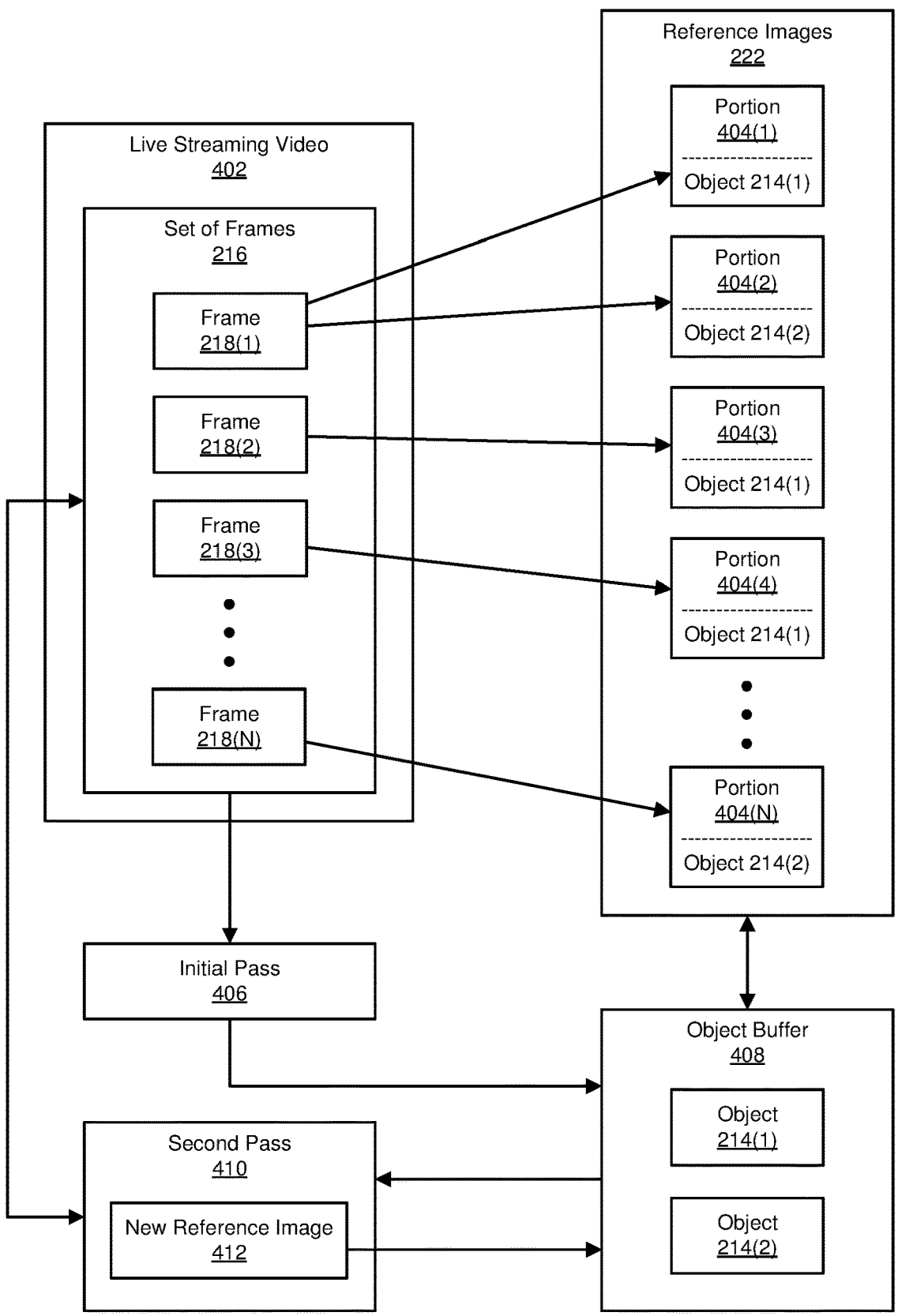
FIG. 4 is a block diagram of detecting reference objects for an exemplary live streaming video.

As illustrated in FIG. 3, video 220 may include a video file 302. In this example, identification module 202 of FIG. 2 may identify a type of file and/or a file extension that indicates the file is a video file. Additionally or alternatively, as illustrated in FIG. 4, video 220 may represent a live streaming video 402. In this example, live streaming video 402 may be identified by a file streaming service and/or a different application that process live streaming content. In another example, a user may select video 220 as the video to compress.

Returning to FIG. 1, at step 120, one or more of the systems described herein may identify, by the computing device, a set of objects that appear in the video as reference images for video encoding. For example, an object module 204 may, as part of computing device 210 in FIG. 2, identify a set of objects 212 that appear in video 220 as reference images 222 for video encoding.

The systems described herein may perform step 120 in a variety of ways. The term "reference image," as used herein, generally refers to an image or a portion of an image used to identify objects or entities in another image, such as a frame of a video. In some embodiments, object module 204 may identify set of objects 212 by identifying a list of expected objects for video 220. As shown in the example of FIG. 3, a list of expected objects 304 may include objects 214(1), 214(2), and 214(3) that are expected to exist in video file 302. In one example, video file 302 may represent a short movie about a dog chasing a cat. In this example, object 214(1) may represent the dog, object 214(2) may represent the cat, and object 214(3) may represent a road on which the dog and the cat run. Additionally, in some examples, object module 204 of FIG. 2 may identify specific frames of video 220 in which an expected object, such as an object 214, may appear. Furthermore, object types may be predetermined, and each object type may have multiple distinct subtypes. For example, set of objects 212 may be determined to include cat and dog types of objects but exclude other potential types, such as background objects not expected to move. In this example, multiple dog objects may appear in video 220, and a dog object may then be divided into subtypes, such as specific dog breeds. Each subtype may then represent a different reference object in set of objects 212.

In other embodiments, object module 204 may identify set of objects 212 by performing an initial pass of a set of frames of the video to detect objects and, subsequently, storing the detected objects in an object buffer. As used herein, the term "object buffer" may refer to a library of objects that may be searched and/or referenced. Object buffers may also be modified by adding or removing objects, such as by maintaining a list of most recently detected objects to reduce the amount of storage space utilized by an object buffer.

For example, as illustrated in FIG. 4, an initial pass 406 of a set of frames 216 may detect objects 214(1) and 214(2). Objects 214(1) and 214(2) may then be stored in an object buffer 408 as a reference. In this example, initial pass 406 may include processing each of frames 218(1)-(N) of set of frames 216 as individual images. Additionally or alternatively, initial pass 406 may include processing a portion of set of frames 216 at a time to generate an updated object buffer 408 to use for later sets of frames, such as in processing a certain amount of video 220 in a video buffer for live streaming video 402. In the above examples, initial pass 406 may be performed to select objects to be used as reference objects in set of objects 212. In an alternative example to FIG. 4, initial pass 406 may be the only pass performed on live streaming video 402 using detected objects to quickly process live streaming video 402 for encoding. Furthermore, in some examples, initial pass 406 may use preselected objects to process video 220 of FIG. 2.

In the example of FIG. 3, reference images 222 may include a set of images for each object in list of expected objects 304. In this example, sets of images 306(1), 306(2), and 306(3) may correspond to objects 214(1), 214(2), and 214(3), respectively. For example, set of images 306(1) may include multiple views and/or angles of the dog of object 214(1).

Additionally or alternatively, in the example of FIG. 4, reference images 222 may include portions 404(1)-(N) of frames 218(1)-(N) in set of frames 216 of video 220 that contains a detected object. For example, a portion 404(1) of frame 218(1) may include object 214(1), and a different portion 404(2) of frame 218(1) may include object 214(2). Portions 404(1) and 404(2) may then be used as part of reference images 222 for objects 214(1) and 214(2). In the above example, object 214(1) may be detected as a dog in set of frames 216, and portions 404(1), 404(3), and 404(4) may be used as reference images 222 of different views of the dog of object 214(1).

Returning to FIG. 1, at step 130, one or more of the systems described herein may train a machine learning algorithm to detect an object from the set of objects. For example, a training module 206 may, as part of computing device 210 in FIG. 2, train a machine learning algorithm 224 to detect object 214 from set of objects 212 in a frame 218 of video 220.

The term "machine learning algorithm," as used herein, generally refers to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods.

The systems described herein may perform step 130 in a variety of ways. In one embodiment, training module 206 may train machine learning algorithm 224 by using a pre-trained object-detection model. In this embodiment, the pre-trained object-detection model may include an algorithm trained with objects detected in one or more other videos and subsequently applied to video 220. In another embodiment, training module 206 may train machine learning algorithm 224 by training machine learning algorithm 224 using reference images 222 for object 214. For example, as illustrated in FIG. 3, reference images 222, containing sets of images 306(1)-(3) for each of objects 214(1)-(3), may train machine learning algorithm 224 to detect list of expected objects 304. As in the examples above, machine learning algorithm 224 may then recognize when the dog, the cat, and/or the road is in a frame of video 220. In this embodiment, machine learning algorithm 224 may be trained to specifically detect objects in video 220.

Additionally or alternatively, as shown in FIG. 4, training module 206 may train machine learning algorithm 224 by performing a second pass 410 of set of frames 216 to detect objects 214(1) and/or 214(2) using object buffer 408. In the example of live streaming video 402, second pass 410 may attempt to find recent objects stored in object buffer 408 and may quickly follow initial pass 406 to reduce lag time in broadcasting live streaming video 402. Furthermore, during second pass 410 of set of frames 216, a new reference image 412 may be detected for an object, such as objects 214(1) and/or 214(2). In this example, object buffer 408 may be updated with new reference image 412. New reference image 412 may then be used to detect objects in subsequent sets of frames processed during broadcasting. In this example, object buffer 408 may continuously update with most recently detected and/or most relevant objects for the next set of frames to be processed for encoding.

Additionally or alternatively, second pass 410 may help detect one or more additional objects not previously detected during initial pass 406, and object buffer 408 may be updated with the additional objects. In these embodiments, second pass 410 may improve reference images 222 and/or set of objects 212 previously detected in initial pass 406. For example, video file 302 of FIG. 3 may represent a non-live video for which there is ample time to slowly perform one or more additional passes to improve reference images 222 after initial pass 406. Additionally or alternatively, multiple passes may be performed to allow preloading reference images 222 for encoding and/or decoding to improve intra-frame compression.

Returning to FIG. 1, at step 140, one or more of the systems described herein may encode each frame of the video using the trained machine learning algorithm. For example, an encoding module 208 may, as part of computing device 210 in FIG. 2, encode each frame, such as frame 218, of video 220 using trained machine learning algorithm 224.

The systems described herein may perform step 140 in a variety of ways. In some examples, encoding module 208 may encode video 220 by detecting at least one object in each frame using machine learning algorithm 224 and compressing each frame to reduce data on non-object images. For example, machine learning algorithm 224 may detect object 214 in frame 218, and encoding module 208 may compress all image data of frame 218 that does not contain object 214 differently from portions of frame 218 that contains object 214. In this example, encoding module 208 may preserve more important image data about object 214 as reference objects such that object 214 of video 220 can be decoded by endpoint users faster and more efficiently. Furthermore, if objects in object buffer 408 of FIG. 4 are not detected in frame 218, additional reference searches may be performed for compression. In these examples, encoding module 208 may search for only the objects in previously detected set of objects 212 in a current frame, such as frame 218, during the encoding process for the frame.

In some embodiments, method 100 of FIG. 1 may further include performing reference-frame compression for frames in which no object is detected by machine learning algorithm 224. In these embodiments, the reference-frame compression may include selecting one or more reference frames, comparing one or more later frames of video 220 with a reference frame, and compressing a later frame to reduce redundant image data.

Figure 5:
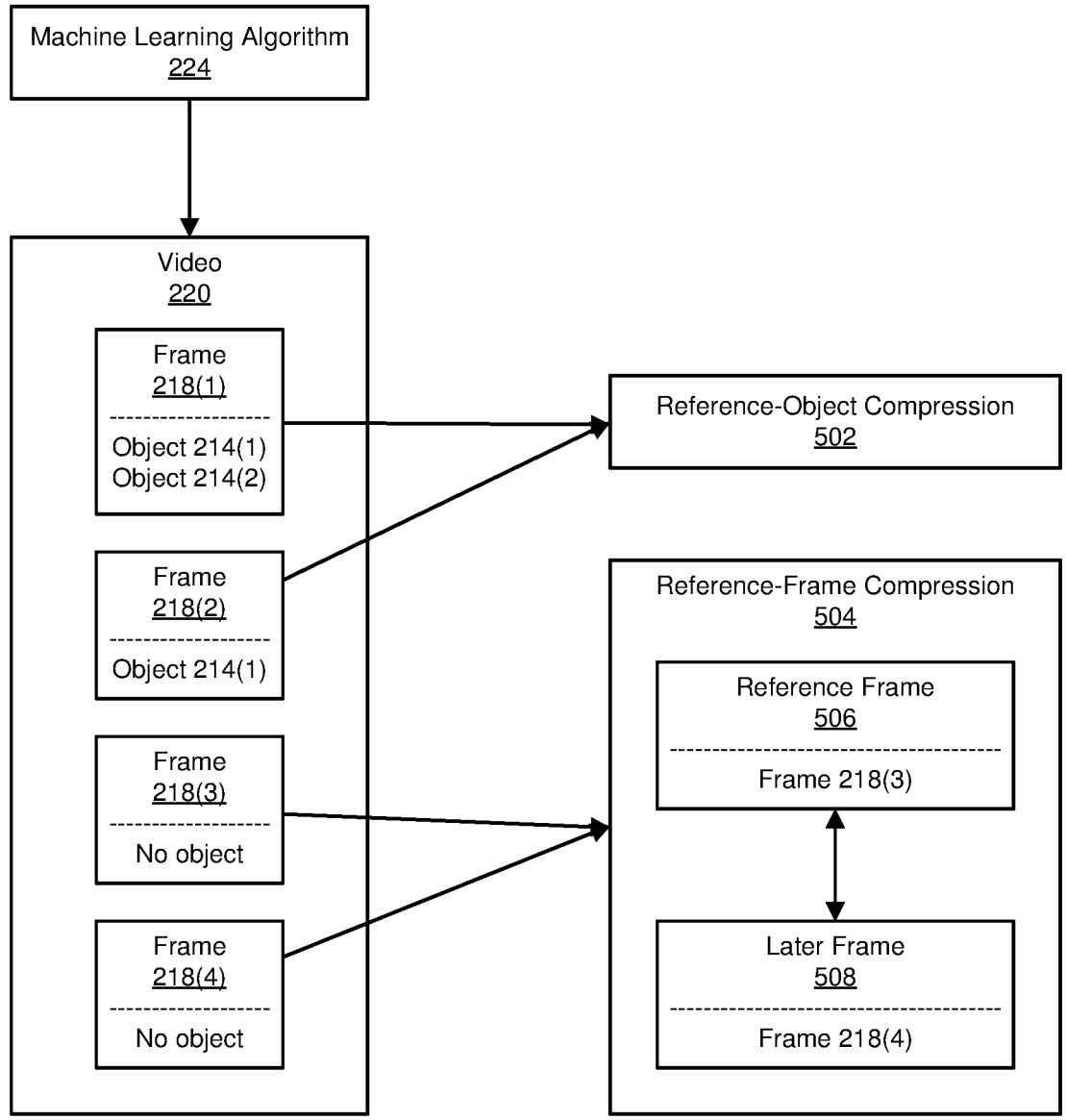
FIG. 5 is a block diagram of an exemplary video encoding process.

As illustrated in FIG. 5, reference-object compression 502 may be performed on frames 218(1) and 218(2) of video 220 in which objects 214(1) and 214(2) are detected using machine learning algorithm 224. Subsequently, reference-frame compression 504 may be performed on remaining frames 218(3) and 218(4) that contain no objects detectable by machine learning algorithm 224. In this example, frame 218(3) may be selected as a reference frame 506 and used to compress a later frame 508, such as frame 218(4). By performing reference-frame compression 504 in addition to reference-object compression 502, the systems described herein may compress video 220 even when machine learning algorithm 224 fails to detect an object from a set of reference objects. In another example, both reference-frame compression 504 and reference-object compression 502 may be attempted, and the best compression may be selected from the two options. Additionally or alternatively, other combinations of reference-frame and reference-object compression may be performed to achieve the best compression with minimal loss for a particular video.

In one embodiment, method 100 of FIG. 1 may further include improving machine learning algorithm 224 with new reference images 226 as shown in FIG. 2. New reference images 226 may include new reference image 412 of FIG. 4 and/or any other new reference image detected by system 200 during the process of encoding video 220. In one example, a user may manually identify new reference images 226 that may be used to improve detection of objects by machine learning algorithm 224. In other examples, new reference images 226 may include more updated reference images based on the most recently encoded segments of video 220. Furthermore, the above methods may be used in conjunction with one or more additional video encoding standards or algorithms, such as H.264, VP9, and/or AOMedia Video 1 (AV1).

As explained above, the disclosed systems and methods may, by identifying distinct reference objects, increase the compression of videos without losing more image data. Specifically, the disclosed systems and methods may first identify potential objects that may be found in a video. By training a machine learning algorithm to detect these potential objects, the systems and methods described herein may then quickly process images of the video that contain these objects. For example, by performing an initial pass to process a set of frames of the video, images of objects detected during the initial pass may be used to train the machine learning algorithm to detect the same objects in later frames of the video.

Additionally, the systems and methods described herein may perform reference-object compression for frames in which objects are detected by the machine learning algorithm. By using reference objects, the disclosed systems and methods may overcome issues with sudden image changes from one frame to the next. In some examples, the systems and methods described herein may also perform reference-frame compression in addition to the reference-object compression. For example, the disclosed systems and methods may use reference frames to identify elements in video frames when objects are not detected. Furthermore, by continuously improving the machine learning algorithm using new objects and/or new reference images, the disclosed systems and methods may more accurately identify objects with better matching. Thus, the systems and methods described herein may improve video encoding with greater efficiency and higher rates of compression.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a frame of a video to be transformed, transform the frame, output a result of the transformation to a storage or output device, use the result of the transformation to identify reference objects in the frame, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, by a computing device, a video to be encoded;
   identifying, by the computing device, a set of objects that appear in the video as reference images for video encoding;
   training a machine learning algorithm to detect an object from the set of objects; and
   encoding each frame of the video using the trained machine learning algorithm, wherein encoding each frame of the video comprises:
   detecting at least one object in each frame using the machine learning algorithm;
   compressing each frame to reduce data on non-object images; and
   performing reference-frame compression for frames in which no object is detected by the machine learning algorithm, wherein the reference-frame compression comprises:
   selecting at least one reference frame;
   comparing at least one later frame of the video with the reference frame; and
   compressing the later frame to reduce redundant image data.

2. The method of claim 1, wherein the identifying the set of objects includes performing an initial pass of a set of frames of the video to detect objects and storing the detected objects in an object buffer, and the training the machine learning algorithm includes performing a second pass of the set of frames to detect objects using the object buffer.

3. The method of claim 2, wherein performing the second pass of the set of frames to detect objects using the object buffer includes updating the object buffer with a new reference image of an object detected during the second pass.

4. The method of claim 3, wherein training the machine learning algorithm includes training the machine learning algorithm using reference images for the object in the updated object buffer.

5. The method of claim 1, wherein the video to be encoded comprises at least one of:
   a video file; or
   a live streaming video.

6. The method of claim 1, wherein identifying the set of objects comprises at least one of:
   identifying a list of expected objects for the video; or
   storing the detected objects in an object buffer.

7. The method of claim 6, wherein the reference images comprise at least one of:
   a set of images for each object in the list of expected objects; or
   a portion of each frame in the set of frames of the video that contains a detected object.

8. The method of claim 6, wherein training the machine learning algorithm to detect the object comprises at least one of:
   training the machine learning algorithm using a pre-trained object-detection model;
   training the machine learning algorithm using the reference images for the object; or
   updating the object buffer with a new reference image.

9. The method of claim 1, further comprising improving the machine learning algorithm with new reference images.

10. A system comprising:
    an identification module, stored in memory, that identifies, by a computing device, a video to be encoded;
    an object module, stored in memory, that identifies, by the computing device, a set of objects that appear in the video as reference images for video encoding;
    a training module, stored in memory, that trains a machine learning algorithm to detect an object from the set of objects;
    an encoding module, stored in memory, that encodes each frame of the video using the trained machine learning algorithm, wherein the encoding module encodes each frame of the video by:
    detecting at least one object in each frame using the machine learning algorithm;
    compressing each frame to reduce data on non-object images; and
    performing reference-frame compression for frames in which no object is detected by the machine learning algorithm, wherein the reference-frame compression comprises:
selecting at least one reference frame;
comparing at least one later frame of the video with the reference frame; and
compressing the later frame to reduce redundant image data; and
at least one processor that executes the identification module, the object module, the training module, and the encoding module.

11. The system of claim 10, wherein the object module identifies the set of objects at least in part by performing an initial pass of a set of frames of the video to detect objects and storing the detected objects in an object buffer, and the training module trains the machine learning algorithm at least in part by performing a second pass of the set of frames to detect objects using the object buffer.

12. The system of claim 11, wherein the training module performs the second pass of the set of frames to detect objects using the object buffer at least in part by updating the object buffer with a new reference image of an object detected during the second pass.

13. The system of claim 12, wherein the training module trains the machine learning algorithm at least in part using reference images for the object in the updated object buffer.

14. The system of claim 10, wherein the video to be encoded comprises at least one of:
a video file; or
a live streaming video.

15. The system of claim 10, wherein the object module identifies the set of objects by at least one of:
identifying a list of expected objects for the video; or
storing the detected objects in an object buffer.

16. The system of claim 15, wherein the reference images comprise at least one of:
a set of images for each object in the list of expected objects; or
a portion of each frame in the set of frames of the video that contains a detected object.

17. The system of claim 15, wherein the training module trains the machine learning algorithm to detect the object by at least one of:
training the machine learning algorithm using a pre-trained object-detection model;
training the machine learning algorithm using the reference images for the object; or
updating the object buffer with a new reference image.

18. The system of claim 10, further comprising improving the machine learning algorithm with new reference images.

19. A non-transitory computer-readable medium comprising one or more computer-executable instructions that, when executed by at least one processor of a computing device, cause the computing device to:
identify a video to be encoded;
identify a set of objects that appear in the video as reference images for video encoding;
train a machine learning algorithm to detect an object from the set of objects; and
encode each frame of the video using the trained machine learning algorithm, wherein the instructions cause the at least one processor to encode each frame of the video at least in part by:
detecting at least one object in each frame using the machine learning algorithm;
compressing each frame to reduce data on non-object images; and
performing reference-frame compression for frames in which no object is detected by the machine learning algorithm, wherein the reference-frame compression comprises:
selecting at least one reference frame;
comparing at least one later frame of the video with the reference frame; and
compressing the later frame to reduce redundant image data.

20. The non-transitory computer-readable medium of claim 19, wherein the instructions cause the at least one processor to identify the set of objects at least in part by performing an initial pass of a set of frames of the video to detect objects and storing the detected objects in an object buffer, and the instructions cause the at least one processor to train the machine learning algorithm at least in part by performing a second pass of the set of frames to detect objects using the object buffer.

* * * * *